US011587318B1

(12) United States Patent
Shayne et al.

(10) Patent No.: US 11,587,318 B1
(45) Date of Patent: Feb. 21, 2023

(54) VIDEO TARGET TRACKING

(71) Applicant: ObjectVideo Labs, LLC, Tysons, VA (US)

(72) Inventors: Ethan Shayne, Clifton Park, NY (US); Donald Gerard Madden, Columbia, MD (US); Brian Blue, McLean, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 31 days.

(21) Appl. No.: 16/927,538

(22) Filed: Jul. 13, 2020

Related U.S. Application Data

(60) Provisional application No. 62/873,298, filed on Jul. 12, 2019.

(51) Int. Cl.
  *G06V 20/40* (2022.01)
  *G06K 9/62* (2022.01)
  *G06V 10/22* (2022.01)

(52) U.S. Cl.
  CPC ........... *G06V 20/41* (2022.01); *G06K 9/6215* (2013.01); *G06K 9/6255* (2013.01); *G06V 10/235* (2022.01)

(58) Field of Classification Search
  CPC ............ G06K 9/00718; G06K 9/2081; G06K 9/6215; G06K 9/6255
  See application file for complete search history.

(56) References Cited

U.S. PATENT DOCUMENTS

| 8,132,096 B1* | 3/2012 | Widdowson | ........... H04N 1/387 382/209 |
| 9,111,444 B2 | 8/2015 | Kaganovich | |
| 10,645,344 B2 | 5/2020 | Marman et al. | |
| 2007/0098303 A1* | 5/2007 | Gallagher | ............. G06F 16/583 382/305 |
| 2019/0080003 A1* | 3/2019 | Alcantara | ............. G06F 16/784 |

\* cited by examiner

*Primary Examiner* — Mark Roz
(74) *Attorney, Agent, or Firm* — Fish & Richardson P.C.

(57) ABSTRACT

Methods, systems, and apparatus, including computer programs encoded on a computer storage medium, for finding lost objects. In some implementations, a video frame is displayed. An input drawing a shape around an area of the video frame is received. A second video frame is displayed. An indication of the shape in the second video frame is displayed. An input to adjust the shape such that the shape is drawn around a second area is received.

19 Claims, 4 Drawing Sheets

VIDEO TARGET TRACKING

CROSS-REFERENCE TO RELATED APPLICATION

This application claims the benefit of U.S. Provisional Application No. 62/873,298, filed Jul. 12, 2019, and titled "VIDEO TARGET TRACKING," which is incorporated by reference.

TECHNICAL FIELD

This description generally relates to object tracking.

BACKGROUND

Developing and testing video analytics depends heavily on sample video with accurate ground-truth data. Typically, ground-truth data is gathered by having a person watch each sample video and annotate their observations.

SUMMARY

In some implementations, a system displays one or more frames of a sample video and enables a user to annotate the frames for use as ground-truth data. A user may draw a shape around an area of a frame that shows an object of interest, also referred to as a target, and the system may display a next immediately subsequent frame from the video with an indication of the previously drawn shape. The system may enable the user to then adjust the shape such that it is drawn around a second area in the subsequent frame that shows the target. For example, the target may be a person that has moved a few pixels to the left between an initial frame and a subsequent frame.

In some implementations, the system displays one or more frames of a sample video to be analyzed for obtaining ground-truth data and enables a user to indicate that the target should be associated with a previously identified target. The system may receive an input drawing a shape around an area of a frame and then receive an input to associate the shape with a previously identified object. In response to this input, the system may identify one or more particular objects that were associated with a previous shape in a previous frame and which are currently not associated with a shape in the frame. The system may provide an indication of these one or more particular objects. The user may provide and the system may receive an input that indicates to associate the shape with one of the one or more particular objects. In response to the received input, the system associates the shape with the indicated particular object.

In one general aspect, a method includes displaying a video frame; receiving an input drawing a shape around an area of the video frame; receiving an input to associate the shape with a previously identified object; identifying a particular object that was associated with a previous shape in a previous video frame and is currently not associated with a shape in the video frame; providing an indication of the particular object; receiving an input to associate the shape with the particular object; and associating the shape with the particular object.

Implementations, may include one or more of the following features. For example, in some implementations, providing an indication of the particular object includes displaying one or more thumbnail images that include a representation of the particular object.

In some implementations, displaying the one or more thumbnail images includes displaying at least one image captured from one or more areas of at least one video frame other than the video frame.

In some implementations, the at least one video frame includes one or more video frames that correspond to one or more times that are earlier than a time corresponding to the video frame.

In some implementations, the at least one video frame includes one or more video frames that have been previously analyzed by the user.

In some implementations, displaying the at least one image includes: determining a threshold number of thumbnail images to display; identifying one or more video frames other than the video frame that include representations of the particular object; selecting from among the one or more video frames a subset of video frames, where a number of video frames in the subset of video frames is the threshold number; and capturing an image that includes a representation of the particular object from each video frame in the subset of video frames to generate the one or more thumbnail images.

In some implementations, the subset of video frames include: those video frames among the one or more video frames that have the closest temporal proximity to the video frame; or those video frames among the one or more video frames that include the highest quality representation of the particular object.

In some implementations, the quality of the representation of the particular object is determined based on one or more of a size of the representation of the particular object in a video frame, whether the representation of the particular object in a video frame is occluded or partially occluded, or whether the representation of the particular object includes a key feature of the particular object.

In some implementations, displaying the one or more thumbnail images includes: displaying multiple thumbnail images that correspond to multiple video frames other than the video frame; and arranging the multiple thumbnail images by temporal proximity of their corresponding video frames to the video frame.

In some implementations, displaying the multiple thumbnail images includes: displaying multiple thumbnail images that include representations of the particular object from the multiple video frames other than the video frame; and arranging the multiple thumbnail images that include representations of the particular object by temporal proximity of their corresponding video frames to the video frame.

In some implementations, the method includes assigning a label to the shape in response to receiving an input drawing a shape around an area of the video frame, where associating the shape with the particular object includes: determining a second label that corresponds to the particular object; and assigning the second label to the shape in place of the label.

In some implementations, the method includes: identifying one or more objects other than the particular object that were associated with one or more previous shapes in at least one video frame other than the video frame, where the one or more objects are currently not associated with a shape in the video frame; and providing indications for the one or more objects.

In some implementations, the method includes determining an order for the particular object and the one or more objects based on at least one of recency of deletion of the particular object and the one or more objects, coordinate proximity of locations of shapes corresponding to the particular object and the one or more objects to a location of the shape, similarity between sizes of shapes corresponding to the particular object and the one or more objects to a size of the shape, and similarity between profiles of shapes corresponding to the particular object and the one or more objects to a profile of the shape, where providing indications for the one or more objects includes arranging the indications for the particular object and the one or more objects based on the order.

In some implementations, identifying the particular object that was associated with the previous shape in the previous video frame and is currently not associated with a shape in the video frame includes: identifying as the previous shape a shape that had been drawn in the previous video frame; identifying the particular object as an object that had been associated with the previous shape; and determining that one or more shapes drawn in the video frame are presently associated with objects other than the particular object.

In some implementations, identifying the particular object as an object that had been associated with the previous shape includes: identifying a label attached to the previous shape; and determining that the label is associated with the particular object, and determining that the one or more shapes drawn in the video frame are presently associated with objects other than the particular object includes determining that labels attached to the one or more shapes drawn in the video frame do not match the label attached to the previous shape.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Obtaining accurate ground-truth data may be important for developing and testing video analytics. Ground-truth data may be a known-correct interpretation of objects within a video sample. Input from a human regarding interpretation of objects may be considered ground-truth. For example, if a user draws an outline around an area of a frame and specifies that area shows a human, it may be considered ground-truth that the area of the frame shows a human. In another, if a user does not draw an outline around any area of a frame and is supposed to draw an outline around any humans, then it may be considered ground-truth that the frame does not show any humans.

The ground-truth data may include location or coordinate information for each object in each frame of the video sample, the type of object (e.g., a person, an animal, a vehicle, a building, a plant or other stationary object, other non-stationary objects, etc.), and one or more direction of movements of each object throughout the timespan of the video sample. Accordingly, obtaining ground-truth data involves tracking targets through the frames of a video sample.

Figure 1:
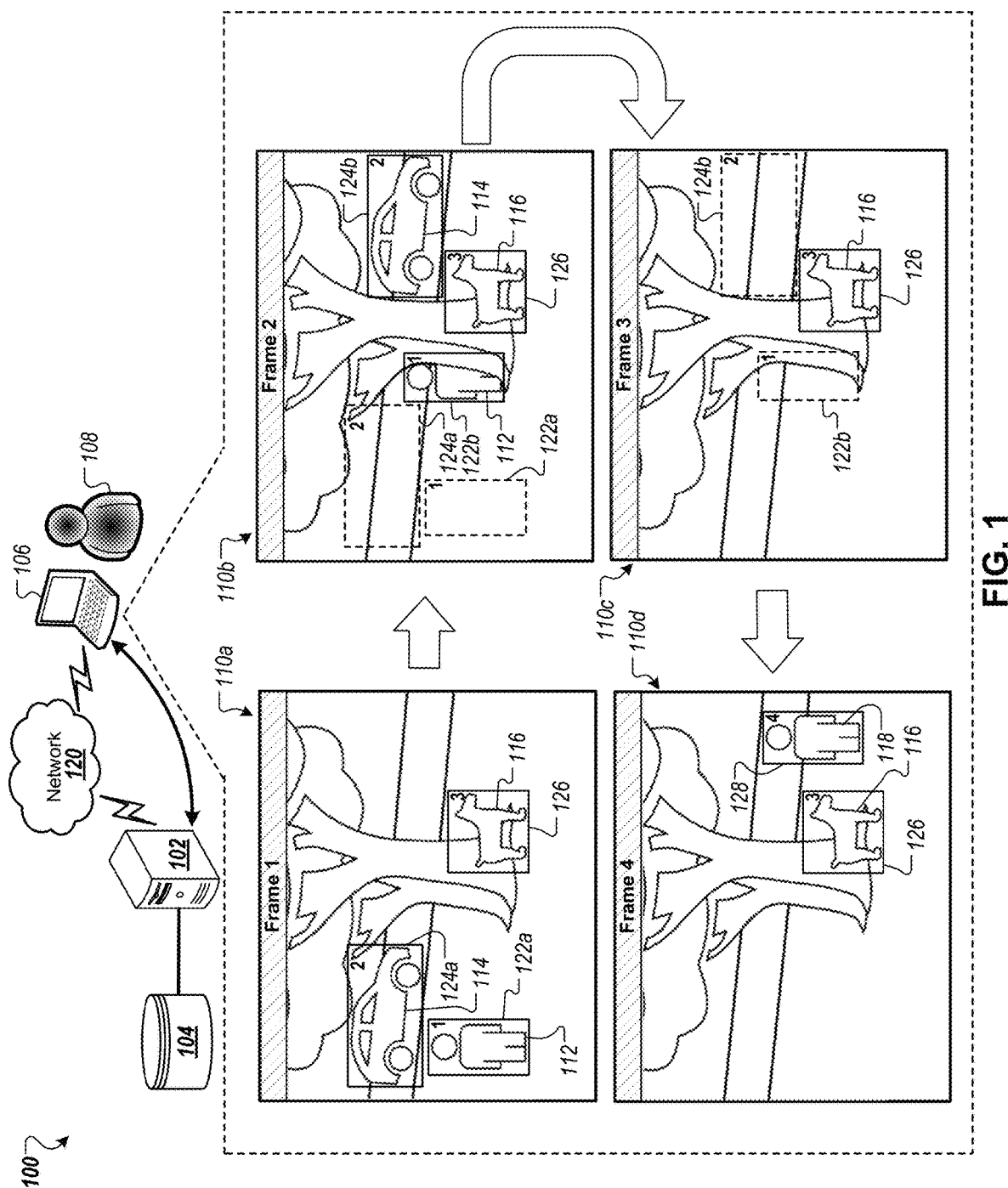
FIG. 1 is a diagram that illustrates an example system for video target tracking.

FIG. 1 illustrates an example system 100 for video target tracking. The system 100 allows the system 100 to generate ground-truth data for a video sample from a user 108 interacting with the system 100 through a client device 106. The system 100 includes a computing system 102 and the client device 106.

The computing system 102 may include one or more computers. The computing system 102 may be a server or a collection of servers. The computing system 102 may be on-site or may be remote, e.g., it may be provided by a third-party. The computing system 102 includes a data storage 104. The data storage 104 may store one more video samples to be analyzed for obtaining ground-truth data. The computing system 102 can communicate with the client device 106 over a network 120.

The client device 106 may be a computing device, such as a laptop computer, a desktop computer, a tablet computer, a mobile telephone, a smart phone, or a personal digital assistant (PDA). The client device 106 can communicate with the computing system 102 over the network 120.

The network 120 can include public and/or private networks and can include the Internet.

The system 100 allows ground-truth data to be obtained for a sample video based on input from a user. Ground-truth data may be used during video analytics development for various purposes, such as machine-learning training and testing. In order to gather a sufficient amount of data for video analytics development, ground-truth data may need to be generated for sample videos on a scale of tens of thousands. Accordingly, having the process for obtaining ground-truth data be fast is advantageous.

The system 100 provides a fast process by, for example, removing the need for the user to re-identify each object from frame-to-frame, removing the need for the user to draw a new shape for each object from frame-to-frame, and/or allowing the user to quickly re-associate an object with a previously identified object.

The system 100 improves accuracy by, for example, reducing the amount of input required. By displaying the shapes of the previously identified objects from an immediately preceding frame, displaying those shapes at a location where the objects were previously located in the immediately preceding frame, and maintaining the association between those shapes and the previously identified objects, the system reduces the chances of a shape being mislabeled and/or identified with an incorrect object.

As shown in FIG. 1, the user 108 has selected a sample video to analyze through the client device 106. When this occurs, the computing system 102 may receive a request for the particular video from the client device 106. In response to the request, the computing system 102 may access its data storage 104 in order to obtain the particular video. The particular video may then be provided to the client device 106 or otherwise made available to the client device 106 by the computing system 102. The particular video may be provided to the client device 106 from the computing system 102 over the network 120.

Through an interface of the client device 106, the user 108 is able to analyze the particular video sample. For example, the particular video includes four frames, frames 110a-110d.

The system 100 allows boxes or shapes to be drawn on each of the frames 110a-110d. For example, the system 100 may provide a dropdown menu, from which a box or other shapes can be selected. As another example, the system 100 may provide a button on the interface of the client device 106 for creating a new box or other shape. In this example, the selection of the button would result in a new box or shape being displayed on the one of the frames 110a-110d. In the first frame 110a, the user 108 has drawn three boxes which are displayed by the system 100 on the interface of the client device 106. These boxes include a first box 122a around a person 112, a second box 124a around a car 114, and a third box 126 around a dog 116. Each of the boxes 122a, 124a, and 126 are associated with the object that they each encompass. As such, the first box 122a is associated with the person 112, the second box 124a is associated with the car 114, and the third box 126 is associated with the dog 116. A number located in the upper-right-hand corner of each of the boxes 122a, 124a, and 126 serves as an identifier for the object associated with the respective box. As such, the person 112, being labeled with "1", is identified as the first tracked object of the sample video, the car 114, being labeled with "2", is identified as the second tracked object of the sample video, and the dog 116, being labeled with "3", is identified as the third tracked object of the sample video.

In some implementations, after a new box is added, it can be resized and moved in order to make sure that it encompasses the intended target or the visible portion of the intended target. The system 100 may provide for resizing and moving a new box. For example, the user 108 can resize and move a new box in a given frame such that the new box encompasses the intended target or the visible portion of the intended target. Additionally or alternatively, resizing and moving a new box can be performed by the system 100. The size of the new box may be adjusted to be as small as possible while completely encompass the intended target or the visible portion of the intended target.

In some implementations, boxes may be drawn around stationary objects, such as the grouping of trees centrally located in the frame 110a.

In some implementations, when drawing a box, the system 100 may provide an interface for the user 108 to indicate or select a classification for an object associated with a particular box. For example, the system 100 may provide a drop-down menu of various classifications that can be selected and associated with an object associated with a box. In this example, the user 108 may indicate that the first box 122a is being drawn for a human, the second box 124a is being drawn for a vehicle, and the third box 126 is being drawn for an animal. As another example, the system 100 may request input to classify the object when the user 108 selects to add a new box. In this example, the system 100 may present the user 108 a drop-down menu of available types or classifications of objects (e.g., a drop-down list including a person, an animal, a vehicle, a building, a plant, etc.). Alternatively, the system 100 may present the user 108 a field where they can type in the classification or type of object (e.g., a field for a label). In some implementations, the system 100 allows for or requests input indicating a subclassification of an object (e.g., a squirrel after a box has been drawn for an object classified as an animal).

The system 100 may allow a user 108 to indicate that they have finished analyzing the first frame 110a. The system 100 may do this, for example, by providing a "done" button, a "finished" button, a "next" button, or a "complete" button. The user 108 may be able to indicate this through the selection of one of these buttons. Alternatively or additionally, the system 100 may provide keyboard or gestural shortcuts for many common functions, such as for moving to a next frame or for indicating that the analysis for the current frame is complete. The keyboard or gestural shortcuts may allow a user, such as the user 108, to analyze a video more quickly. When the system 100 receives an indication that the user 108 has finished analyzing the first frame 110a, the system 100 may present the user 108 with the next frame in the sample video. Here, the next frame is the second frame 110b.

When the user 108 is brought to the second frame 110b, the system 110 may display for the user 108 their previously drawn boxes 122a, 124a, and 126 from the immediately preceding frame (e.g., frame 110a). The previously drawn boxes 122a, 124a, and 126 may each be provided in the frame 110b at the same position in which they were located in the frame 110a. The system 100 may allow the user 108 to modify these boxes as needed for the new frame. A modification may include the moving or repositioning of one or more boxes, the deletion of one or more boxes, the resizing of one or more boxes, the renumbering of one or more boxes, or the re-association of one or more boxes. Re-association will be discussed in more detail with respect to FIG. 2.

Here, using the system 100, the user 108 modifies the first box 122a by repositioning it in a different area of the frame 110b due to the person 112 having moved from their initial position in the frame 110a to a second position in the frame 110b. The user 108 also modifies the first box 122a by adjusting its size. Here, because the visible part of the person 112 is smaller due to the person 112 having moved partially behind the grouping of trees, the user 108 reduces the size of the first box 122a. The modified first box 122b is shown encompassing the visible part of the person 112.

Similarly, using the system 100, the user 108 also modifies the second box 124a by repositioning it in a different area of the frame 110b due to the car 114 having moved from its initial position in the frame 110a to a second position in the frame 110b. The repositioned second box 124b is shown encompassing the car 114.

The user 108 does not modify the third box 126 because the dog 116 is still visible within the frame 110b and has not moved from its initial position in the frame 110a. Accordingly, the box 126 still encompasses the dog 116 and does not need to be modified.

Once the system 100 receives input indicating that the user 108 has finished analyzing the second frame 110b, the system 100 brings the user 108 to the third frame 110c. As shown, the boxes 122b, 124b, and 126 are each provided in the frame 110c at the position in which they were located in the second frame 110b.

Here, using the system 100, the user 108 modifies the first box 122b by deleting it due to the person 112 no longer being visible within the frame 110c. The person 112 is likely no longer visible due to them having moved completely behind the grouping of trees and, thus, being hidden by the grouping of trees.

In some implementations, where the user 108 believes that an object, such as the person 112, has moved behind something, such as the grouping of trees, the system 100 allows for the creation of a placeholder box or other shape for the disappeared object. Alternatively, the system 100 may allow the user 108 to use a previously drawn box or other shape as a placeholder for the disappeared object. For example, the user 108, using the system 100, may choose to keep the first box 122b, and move and potentially resize it over the grouping of trees where the user 108 believes the person 112 to be located. The user 108 may mark the first box 122b as a placeholder box in the frame 110c. As another example, the user 108, using the system 100, may draw a new box or other shape around the area where the user 108 believes the person 112 to be located. The system 100 may designate this new box (or other shape) as a temporary box or as a placeholder box. Alternatively, the user 108, using the system 100, may be able to designate the new box (or other shape) as a temporary box or as a placeholder box.

Instead of marking the first box 122b as a placeholder box, the system 100 may allow for the deletion of the first box 122b in the frame 110c. For example, upon analyzing the frame 110c and determining the person 112 is no longer visible, the user 108 may modify the first box 122b by deleting the first box 122b from the frame 110c.

Using the system 100, the user 108 also modifies the second box 124b by deleting it. The user 108 deletes the second box 124b using the system 100 due to the car 114 no longer being visible within the frame 110c. The car 114 is likely no longer visible due to it having continued down the road out of the view of the video camera.

The user 108 again does not modify the third box 126 because the dog 116 is still visible within the frame 110c and has not moved from its previous position in the frame 110b. Accordingly, the box 126 still encompasses the dog 116 and does not need to be modified.

Once the system 100 receives input indicating that the user 108 has finished analyzing the third frame 110c, the system 100 brings the user 108 to the fourth frame 110d. As shown, the system 100 provides the box 126 in the frame 110d at the position in which it was located in the third frame 110c.

The user 108 again does not modify the third box 126 because the dog 116 is still visible within the frame 110d and has not moved from its previous position in the frame 110c. Accordingly, the box 126 still encompasses the dog 116 and does not need to be modified.

Using the system 100, the user 108 can add a new shape, a fourth box 128 for a person 118 that has appeared in the fourth frame 110d. This can be done in some cases, such as when the user 108 deleted the first box 122b in the frame 110c. The system 100 labels the person 118 with the number "4", representing that the person 118 is identified as the fourth tracked object of the sample video. The person 118 may be the same person as the person 112 as previously shown in frames 110a and 110b after reemerging from behind the grouping of trees. Upon selection of the fourth box 128, the system 100 may present the user 108 with a list of actions that can be performed on or with the fourth box 128 and the person 118. As will be discussed in more detail below with respect to FIG. 2, this list of actions may include an option to re-associate the box 128 and/or the person 118 with the previously identified person 112. However, if it is determined that the person 118 is a person different than the person 112, the user 108 may choose to leave the fourth box 128 as is.

However, when a placeholder box was created in frame 110c (e.g., from the first box 122b), the system 100 can allow the user 108 to associate the placeholder box with the person 118 (thereby indicating that the person 118 is the person 112) instead of adding a fourth box 128. For example, the system 100 may allow the user 108 to move the first box 122b to the person 112's new position and to mark the first box 122b as not a placeholder box.

In some implementations, the system 100 allows the user 108 to draw shapes other than boxes around the objects in each of the frames of the sample video. For example, the system 100 may permit the user 108 to trace the shape of the object itself. As another example, the system 100 may allow the user 108 to select a different type of shape to draw, e.g., a circle, an oval, a square, a rhombus, a trapezoid, etc. In this example, the system 100 may provide a drop-down menu or another type of menu including a list of shapes. Alternatively, the system 100 may provide a field where the user 108 can enter the type of shape they would like to draw.

Figure 2:
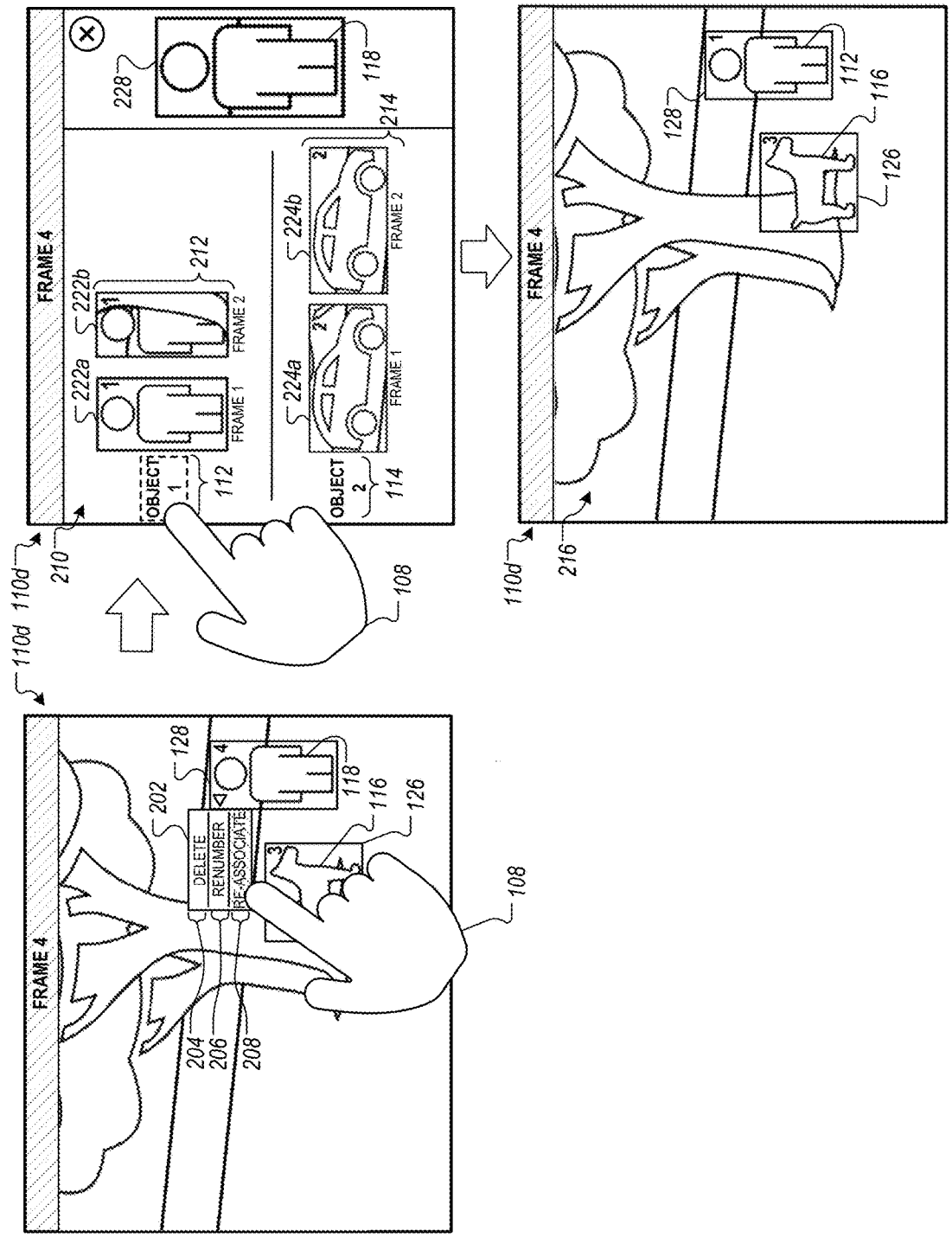
FIG. 2 is a diagram that illustrates re-associating a tracked target.

FIG. 2 is a diagram that illustrates the system 100 re-associating a tracked target in the fourth frame 110d. Here, the tracked target being re-associated is the person 118 as shown in FIG. 1. Here, the user 108 has selected the fourth box 128. Upon selection of the fourth box 128, the system 100 provides the user 108 with an action menu 202. The action menu 202 may contain a plurality of functions that the system 100 can perform on the fourth box 128 and/or on the person 118. The action menu 202 includes a delete function 204, a renumber function 206, and a re-associate function 208. If the user 108 were to select the delete function 204, then the system 100 would remove the fourth box 128. If the user 108 were to select the renumber function 206, the system 100 would choose a new object number for the person 118 (e.g., would increase the current number from "4" to "5") or would prompt the user 108 to enter a new object number for the person 118. The number chosen by the system 100 or entered by the user 108 may need to be a number that is not currently in use and/or has not been previously used. Accordingly, in this scenario, the system 100 would prevent the user 108 from entering the number 1, the number 2, or the number 3 when renumbering the person 118 as these numbers have already been used to identify other objects.

Here, the user 108 selects the re-associate function 208 from the action menu 202. The re-associate function 208 allows for associating the fourth box 128 and/or the person 118 with a previously identified object. In response to the selection of the re-associate function 208, the system 100 presents to the user 108 a re-association interface 210 for the person 118 in the fourth frame 110d of the sample video. The re-association interface 210 includes a list of previously identified objects on the left side of the interface 210 and an enlarged thumbnail 228 of the contents of the box 128 encompassing the person 118 to be re-associated on the right side of the interface 210. In some implementations, the thumbnail 228 of the box 128 encompassing the person 118 to be re-associated on the right side of the interface 210 is not enlarged. In these implementations, the thumbnail 228 of the box 128 may be the same size or substantially the same size as the thumbnail 222a of the box 122a from the first frame 110a and/or the thumbnail 222b of the box 122b from the second frame 110b.

The previously identified objects presented on the left side of the interface 210 are target options chosen by the system 100. In response to a selection of one of these target options by the user 108, the system will reidentify the person 118 as the selected previously identified object and the fourth box 128 will be relabeled accordingly. The previously identified objects presented by the system 100 include the person 112 (e.g., the first object) and the car 114 (e.g., the second object). As an example, the system 100 determines not to present the dog 116 as a target option. The system 100 may make this determination based on recognizing that the dog 116 is currently identified in the fourth frame 110d by association with the box 126.

The system 100 may present one or more thumbnails on the interface 210 for each of the previously identified objects. As an example, the system 100 presents a first set of thumbnails 212 for the person 112. The set of thumbnails 212 include one or more images of the person 112 in previous frames of the sample video. Specifically, the set of thumbnails 212 includes the thumbnail 222a of the contents of the box 122a encompassing the person 112 in the first frame 110a, and the thumbnail 222b of the contents of the box 122b encompassing the person 112 in the second frame 110b. The system 100 presents a second set of thumbnails 214 for the car 114. The set of thumbnails 214 include one or more images of the car 114 in previous frames of the sample video. Specifically, the thumbnails 214 include a thumbnail 224a of the contents of the box 124a encompassing the car 114 in the first frame 110a, and a thumbnail 224b of the contents of the box 124b encompassing the car 114 in the second frame 110b.

In some implementations, a previous frame of the sample video is a frame that appears temporally earlier than the current frame. For example, a previous frame of the sample video can be the first frame 110a, the second frame 110b, or the third frame 110c when the current frame being analyzed is the fourth frame 110d.

In some implementations, a previous frame of the sample video is a frame that has been analyzed before the current frame that is being analyzed. For example, a previous frame of the sample video can include a fifth frame subsequent to the fourth frame 110d if the user 108 or another user has analyzed the fifth frame before the analysis of the fourth frame 110d.

In some implementations, the system 100 may choose not to present one or more objects as target options based on the classifications assigned to those one or more objects. For example, the system 100 may recognize that the object associated with the box 128, e.g., the person 118, has been classified as a person, that the object associated with the box 122, i.e. the person 112, has been classified as a person, that the object associated with the box 124, i.e. the car 114, has been classified as a vehicle, and/or that the object associated with the box 126, i.e. the dog 116, has been classified as an animal and/or a pet. Accordingly, the system 100 may choose not to present the car 114 as a target option since the system 100 recognizes that the car 114 is classified as a vehicle and not as a person. Similarly, the system 100 may choose not to present the dog 116 as a target option since the system 100 recognizes that the dog 116 is classified as an animal and/or a pet and not as a person. Similarly, the system 100 may choose to only present person objects as target options since the system 100 recognizes that the person 118 is classified as a person. Accordingly, the system 100 may choose to only present the person 112 as a target option since the system 100 recognizes that the person 112 is classified as a person and because there are no other person object besides the object being re-associated, e.g., the person 118.

In some implementations, the system 100 has not received a classification for the object being re-associated. In these implementations, the system 100 may choose to present some or all of the available objects as target options regardless of their classification. In these implementations, once a user has re-associated the object with a target object, the re-associated object may obtain the classification of the target object. For example, if the object associated with the box 128 was not yet classified and if a user re-associated that object with the person 112, the system 100 would classify the object associated with the box 128 as a person.

The system 100 may arrange the sets of thumbnails 212 and 214 for each of the objects within the list of objects by temporal proximity (e.g., by the frame of the video sample from which they were taken from). For example, as shown in FIG. 2, the system 100 may arrange the sets of thumbnails 212 and 214 such that the oldest thumbnails are placed farthest to the left (e.g., from the first frame 110a, which was the first frame in which the person 112 and the car 114 appeared), and the newest thumbnails are placed farthest to the right (e.g., from the second frame 110b, which was the last frame in which the person 112 and the car 114 appeared).

In some implementations, where there are more thumbnails for a previously identified object than can be displayed (e.g., where there are four or more frames of the sample video in which the object appears and, thus, four or more thumbnails of the object available), the system 100 may select the two, three, or four most recent frames in which the object appears to use in generating the thumbnails (e.g., one thumbnail of the object for each of the most recent frames).

In some implementations, where there are more thumbnails for a previously identified object than can be displayed (e.g., where there are four or more frames of the sample video in which the object appears and, thus, four or more thumbnails of the object available), the system 100 may select the two, three, or four best thumbnails. The system 100 may select the top two, three, or four thumbnails from all available thumbnails of an object based on the size of the thumbnail, the image quality of the thumbnail, and so on. For example, the system 100 may select larger thumbnails over small thumbnails. A size of the thumbnail may be a pixel size. As another example, the system 100 may select thumbnails containing a higher quality image over thumbnails containing a lower quality image. The image quality of a thumbnail may be based on whether an object in the thumbnail is occluded such that the system 100 selects thumbnails containing unobstructed views of objects over thumbnails containing occluded views of objects. Similarly, the image quality of a thumbnail may be based on whether a thumbnail contains a face of an object such that the system 100 selects thumbnails containing the face of the object— e.g., for those objects that have faces, as determined by the system 100 based on the classifications of the objects—over thumbnails which do not contain the face of the object. In these implementations, the system 100 may only select a thumbnail for display if the thumbnail contains an unobstructed view of the object and/or contains a face of the object.

In some implementations, the system 100 may consider a thumbnail with more landmarks to be higher quality than one with fewer landmarks. Landmarks may include facial landmarks such as, for example, eyes, ears, mouth, hair, nose, etc. of a target person. For example, a thumbnail that shows both eyes and a mouth may be considered higher quality than a thumbnail that has a face, but only includes one eye. The landmarks included in a given thumbnail may be identified automatically by the system using facial recognition. Additionally or alternatively, the landmarks included in a given thumbnail may be marked by the user 108.

In some implementations, the system 100 may present all the thumbnails of a previously identified object from a particular video. In these implementations, the system 100 may display a grid or list containing all of the thumbnails for the previously identified object from a particular video. The grid or list of thumbnails may be scrollable in a horizontal and/or vertical direction. The grid or list of thumbnails may be arranged in the order of the frames from which the thumbnails were taken. For example, the system 100 may present a thumbnail of a previously identified object taken from the current frame or a frame most recent to the current frame before other thumbnails of the previously identified object taken from older frames.

In some implementations, the system 100, presents only a single thumbnail for each of the previously identified objects. This thumbnail may be selected from the most recent frame in which the object appeared.

In some implementations, when the user 108 selects a thumbnail of a previously identified object, the system 100 may open the entire frame associated with that thumbnail, e.g., the frame from which the thumbnail was generated. In these implementations, when the frame is opened, the system 100 may distinguish the previously identified object from other objects in that frame, e.g., through highlighting the object or the box surrounding the object, by changing the line of the box surrounding the object from a solid line to a dashed line, by pulsating the box surrounding the object, etc. For example, if the user 108 were to select the thumbnail of the box 122a encompassing the person 112, the system 100 may open up the first frame 110a as shown in FIG. 1 and change the line of the box 122a from a solid line to a dashed line. This feature may help the user 108 more accurately re-associate the person 118 by providing them with context to assist them in making their selection. Specifically, this feature may help the user 108 determine if the person 112 was last seen near the location where the person 118 is currently located in the fourth frame 110d.

In some implementations, when the user 108 selects a thumbnail of a previously identified object, the system 100 may display the current frame (here, the fourth frame 110d) and the selected thumbnail or an outline of the thumbnail overlaying the current frame at a location of the thumbnail's respective box. For example, if the user 108 were to select the thumbnail of the box 122b encompassing the person 112, the system 100 may present the fourth frame 110d in its entirety overlaid with the box 122b (e.g., with the box 122b empty) or an outline of the box 122b at the box 122b's location in the second frame 110b as shown in FIG. 1. This feature may help the user 108 determine if the path of movement of the person 112 associated with the box 122b matches that of the person 118. In these implementations, the system 100 may also overlay the fourth frame 110d with all of the boxes or outlines of boxes of the object associated with selected thumbnail. For example, in addition to the box 122b or an outline of the box 122b, the system may also overlay the fourth frame 110d with the box 122a or an outline of the box 122a when the user selects the thumbnail for the box 122b encompassing the person 112.

The system 100 may present the previously identified objects 112 and 114 in a particular order. In doing so, the system 100 may first determine an order of the previously identified objects. The criteria that the system 100 may use in determining the order can include, for example, recency of deletion of the previously identified object, coordinate proximity of the previously identified object to the object being re-associated, and/or the size and shape of the box associated with the previously identified object to the size and shape of the box of the object being re-associated. For example, the system 100 may determine an order of the previously identified objects 112 and 114 based on which objects were most recently deleted (e.g., which were removed from a frame closest to the current frame), with the most recently deleted objects placed higher in the list. This is beneficial because objects that have disappeared longer ago may be less likely to reappear.

As another example, the system 100 may determine an order of the previously identified objects 112 and 114 based on coordinate proximity. That is, the system 100 may determine a coordinate location of the boxes associated the previously identified objects 112 and 114 within the interface of the client device 106 (as shown in FIG. 1), determine a coordinate location of the box 128, compare those coordinate locations associated with the previously identified objects 112 and 114 with the coordinate location of the box 128, and, based off of that comparison, identify which object of the previously identified objects 112 and 114 is closest to the box 128 (and, therefore, which is closest to the person 118). In this example, the system 100 may place which ever object of the previously identified objects is closest to the person 118 higher.

As another example, the system 100 may determine an order of the previously identified objects 112 and 114 based on their respective box's size and shape similarity to the box 128 of the person 118. In determining a size and shape similarity, the system 100 may determine and consider an area of the box or other shape (e.g., a pixel size) for each of the boxes associated with the previously identified objects 112 and 114, may determine and consider the shape drawn (e.g., whether a rectangle/box, a square, an oval, a circle, a rhombus, a trapezoid, etc.), and/or may determine and consider a dimension ratio of the drawn shape for each of the shapes/boxes associated with the previously identified objects 112 and 114.

In some implementations, the system 100 uses multiple criteria in determining an order of the previously identified objects. For example, the system 100 may determine an order for presenting the previously identified objects based on which objects of the previously identified objects were most recently deleted, the coordinate proximity of the boxes/shapes associated with the previously identified objects, and on the size and shape similarity of the boxes/shapes associated with the previously identified objects.

As shown in FIG. 2, the user 108 selects the first object, the person 112. In response to the user 108 selecting the person 112, the system 100 re-associates the person 118 with the person 112. Upon selecting, the first object, the person 112, the system 100 displays the fourth frame 110d with the updated interface 216. The interface 216 now shows the box 128 encompassing the person 112. The system 100 relabels the box 128 with the number "1", which serves as an identifier for the person 112.

In some implementations, the user 108 may select the first object, the person 112, by selecting one of the thumbnails of the set of thumbnails 212 for the first object.

Figure 3:
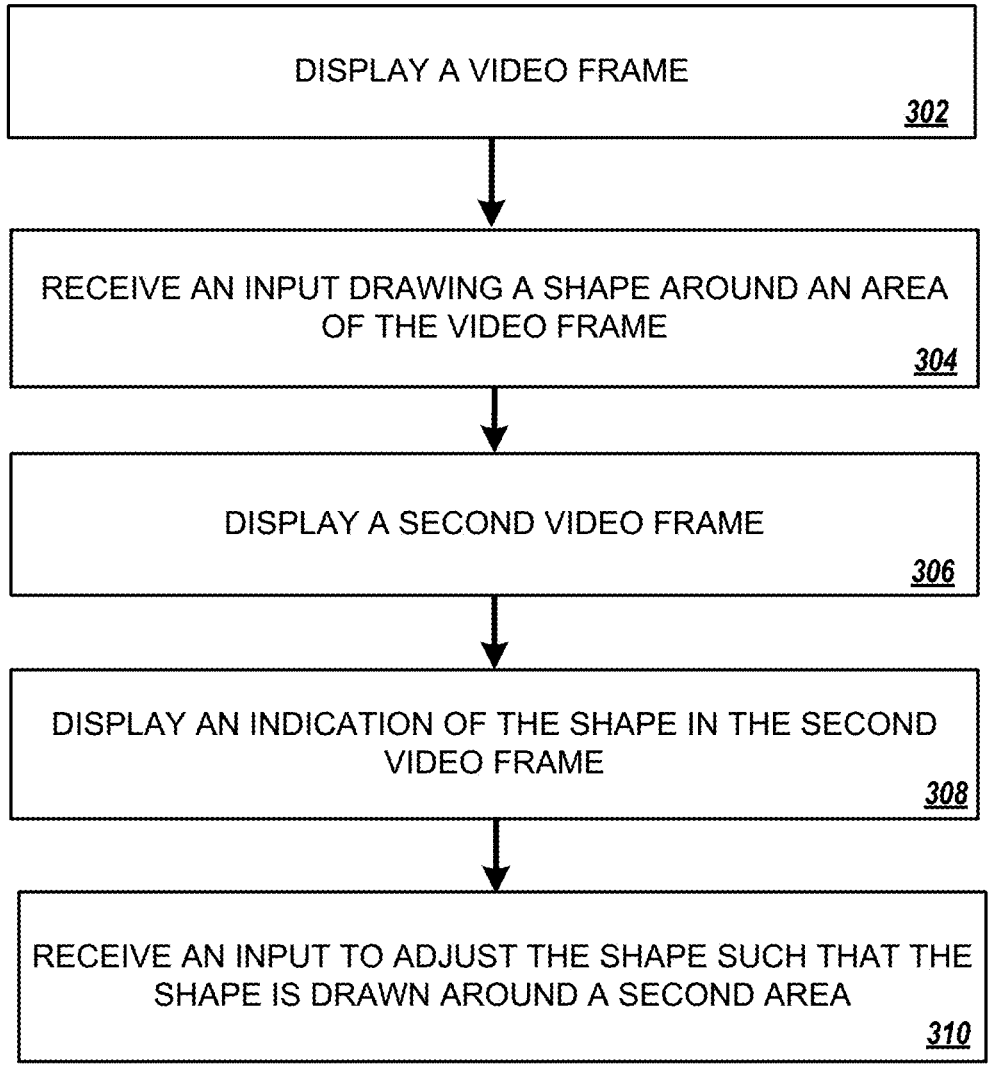
FIG. 3 is a flowchart of an example process for video target tracking.

FIG. 3 is an example process 300 for video target tracking. The process 300 can be performed, at least in part, using the system 100 described herein.

The process 300 includes displaying a video frame (302). For example, the displayed video frame may be frame 110a shown in FIG. 1. The video frame may be displayed on an interface, such as a graphical user interface, of a computing device. For example, frame 1 may be displayed on the client device 106 as shown in FIG. 1. The displayed video frame may be the first frame of a sample video. For example, displayed video frame may be frame 1 as shown in FIG. 1.

The process 300 includes receiving an input drawing a shape around an area of the video frame (304). For example, the shape may be the box 122a shown in FIG. 1. The shape may be a box/rectangle (e.g., the box 122b as shown in FIGS. 1-2) or a different shape (e.g., a square, a circle, an oval, a trapezoid, a rhombus, a trace of the encompassed object or other free-form shape, etc.). The user (e.g., the user 108 as shown in FIGS. 1-2) may draw the shape using a touch input, a mouse input, a stylus input, etc. The area of the video frame around which the shape is drawn includes an object to be tracked, such that the object is encompassed by the drawn shape. The shape may include a label that identifies the object which it encompasses (e.g., a number or a letter).

The process 300 includes displaying a second video frame (306). For example, the displayed second video frame may be frame 110b shown in FIG. 1. The displayed second video frame may be one frame of a sample video that is to be analyzed in order to obtain ground-truth data. The second video frame may be displayed on an interface, such as a graphical user interface, of a computing device (e.g., the client device 106 as shown in FIG. 1). The displayed second video frame may be the second frame of a sample video (e.g., the frame 110b as shown in FIG. 1).

The process 300 includes displaying an indication of the shape in the second video frame (308). For example, the indication may be the box 122a in frame 110b shown in FIG. 1. This indication may be the shape itself or an outline of the shape. This indication may be placed in the same location on the second frame as where the shape was located in the frame. For example, this indication may be the box 122a or the box 124b provided in the second frame 110b as shown in FIG. 1, where both box 122a and 124b are placed at the same location in the second frame 110b as they were placed in the first frame 110a. This indication may include the same label as the shape.

The process 300 includes receiving an input to adjust the shape such that the shape is drawn around a second area (310). For example, the input may be touch input that drags the box 122b from its initial location in the second frame 110b as indicated by box 122a to its final location in the second frame 110b shown in FIG. 1. This input may be made by a client device user (e.g., the user 108 as shown in FIGS. 1-2). This input may include one or more touch inputs, mouse inputs, stylus inputs, etc. An adjustment to the shape may include moving the shape (e.g., changing its coordinate information) within the interface, resizing the shape, or changing the type of shape (e.g., changing it from a box shape to a free-form shape). The second area of the video frame around which the shape is drawn includes the object to be tracked, such that the object is encompassed by the adjusted shape.

Figure 4:
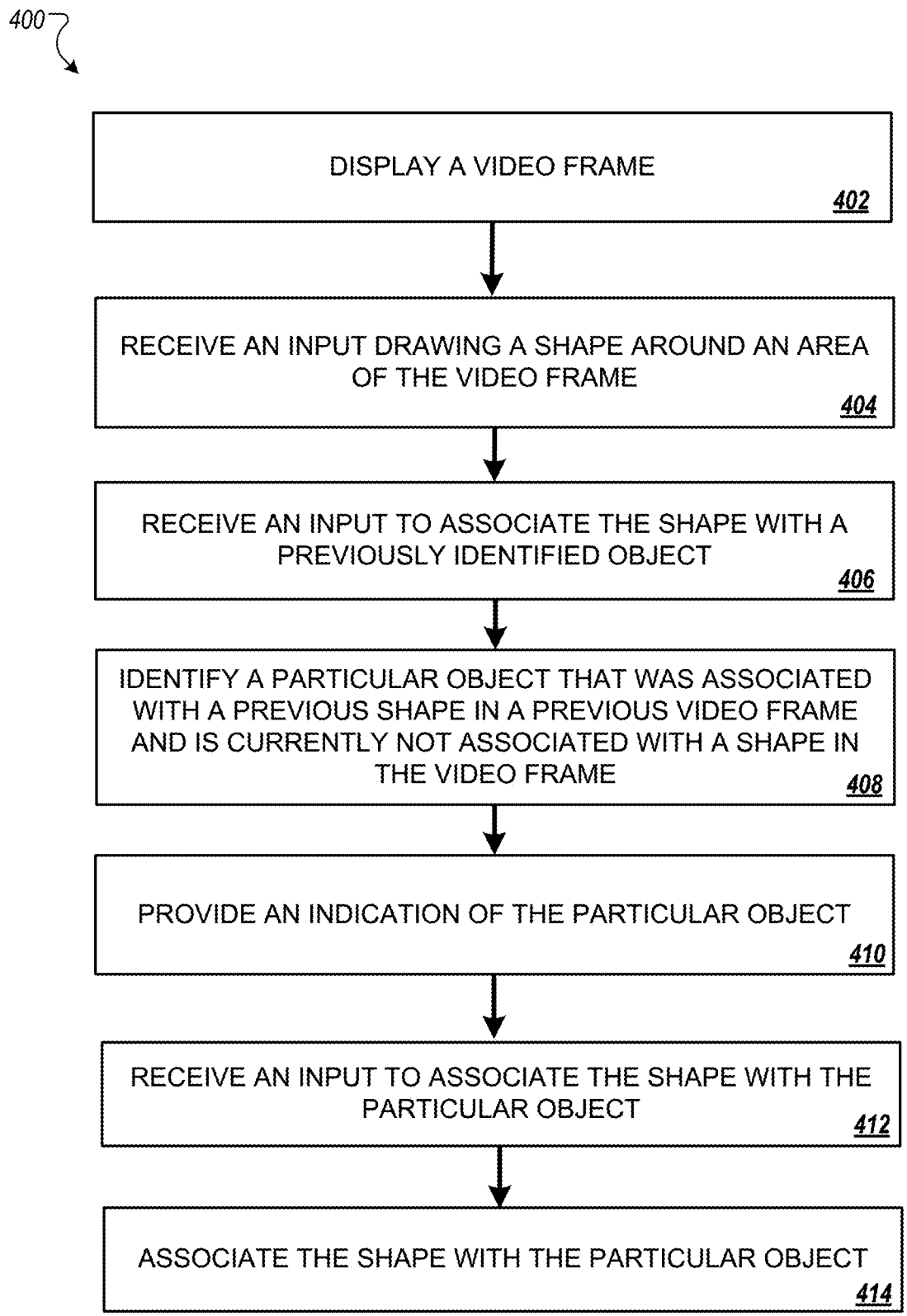
FIG. 4 is a flowchart of an example process for re-associating a tracked target.

FIG. 4 is an example process 400 for re-associating a tracked target. The process 400 can be performed, at least in part, using the system 100 described herein.

The process 400 includes displaying a video frame (402). For example, the client device 106 may display Frame 1 to the user 108. The displayed video frame may be one frame of a sample video that is to be analyzed in order to obtain ground-truth data. The video frame may be displayed on an interface, such as a graphical user interface, of a computing device (e.g., the client device 106 as shown in FIG. 1). The displayed video frame may be the second or later frame of a sample video (e.g., the frame 110b, 110c, or 110d as shown in FIG. 1).

The process 400 includes receiving an input drawing a shape around an area of the video frame (404). For example, the client device 106 may receive an indication of a rectangular box drawn around an area of Frame 4 that shows a person. The shape may be a box/rectangle (e.g., the box 122b as shown in FIGS. 1-2) or a different shape (e.g., a square, a circle, an oval, a trapezoid, a rhombus, a trace of the encompassed object or other free-form shape, etc.). The user (e.g., the user 108 as shown in FIGS. 1-2) may draw the shape using a touch input, a mouse input, a stylus input, etc. The area of the video frame around which the shape is drawn includes an object to be tracked, such that the object is encompassed by the drawn shape. The shape may include a label that identifies the object which it encompasses (e.g., a number or a letter).

The process 400 includes receiving an input to associate the shape with a previously identified object (406). For example, the client device 106 may receive a selection of an option of re-associate in a menu that is displayed by the client device 106 to the user 108 after the box around the person shown in Frame 4. This input may be made by a client device user (e.g., the user 108 as shown in FIGS. 1-2). This input may include one or more touch inputs, mouse inputs, stylus inputs, etc. The input to associate the shape may be an input to re-associate the shape as described herein with respect to FIG. 2. The previously identified object may be an object that was identified with a drawn shape in a previous frame of the video.

The process 400 includes identifying a particular object that was associated with a previous shape in a previous video frame and is currently not associated with a shape in the video frame (408). For example, the client device 106 may determine that Frame 2 in the video included a shape associated with a particular human and the particular human is currently not associated with any shape in Frame 4.

In some implementations, identifying the particular object that was associated with the previous shape in the previous video frame and is currently not associated with a shape in the video frame includes identifying as the previous shape a shape that had been drawn in the previous video frame, identifying the particular object as an object that had been associated with the previous shape, and determining that one or more shapes drawn in the video frame are presently associated with objects other than the particular object. For example, with respect to FIGS. 1-2, in identifying the person 112, the system 100 can identify the box 122a that was previously drawn in the first frame 110a, identify that the person 112 as the object that was associated with the box 122a, and determine that the box 126 and the box 128 drawn in the fourth frame 110d currently being analyzed have not been associated with the person 112. In some cases, the system 100 may first look at the shapes drawn in the current frame being analyzed to determine which previously drawn shapes and/or which previously identified objects should be ignored.

As an example, the system 100 may determine the box 126 is associated with the dog 116 and that the box 128 has been associated with a new object, the person 118. As a result, in identifying a shape that had been drawn in the previous video frame, the system 100 may ignore previously drawn shapes that are associated with the dog 116. Accordingly, the system 100 may only identify the boxes 122a and 124a in the first frame 110a and the boxes 122b and 124b in the second frame 110b as shapes that had been drawn in the previous video frame. The system 100 may then lookup the objects that have been associated with these boxes.

In some implementations, identifying the particular object as an object that had been associated with the previous shape includes identifying a label attached to the previous shape, and determining that the label is associated with the particular object. For example, with respect to FIGS. 1-2, the system 100 may use the label "1" attached to the box 122a in the frame 110a and the box 122b in the frame 110b to determine that the boxes 122a-122b are associated with the person 112 (e.g., defines an area that includes a representation of the person 112). Determining that the one or more shapes drawn in the video frame are presently associated with objects other than the particular object can include determining that labels attached to the one or more shapes drawn in the video frame do not match the label attached to the previous shape. For example, with respect to FIGS. 1-2, the system 100 can determine that none of the shapes in the fourth frame 110d are assigned the label "1" that was assigned to the boxes 122a-122b in the frames 110a-110b. Accordingly, the system 100 may determine the person 112 that is associated with the label "1" is a candidate object for re-association.

The system (e.g., the system 100 as shown in FIG. 1) may identify the particular object by identifying one or more objects that had been previously identified with a drawn shape in a previous frame and which are not currently associated with a shape in the video frame. In some implementations, instead of determining one object, the system determines multiple objects. For example, the system may identify both the person 112 and the car 114 as shown in FIG. 2 as objects that had been previously identified with a drawn shape in a previous frame and are not currently associated with a shape in the video frame. In this example, the system 100 may determine that both the person 112 and the car 114 are viable objects to be associated with the shape.

The process 400 includes providing an indication of the particular object (410). For example, the client device 106 may provide an indication of the particular human. The indication may include a thumbnail of the particular object or a set of thumbnails of the particular object (e.g., the set of thumbnails 212 or 214 as shown in FIG. 2). The thumbnail(s) may be of a previously drawn shape and its contents (e.g., the area of the respective frame the previously drawn shape encompasses, including the particular object from that respective frame) from a previous frame of the video (e.g., the box 122a as shown in FIG. 2). In some implementations, the indication is just a label of the particular object (e.g., "Object 1" as shown in FIG. 2). In some implementations, the system provides an indication of a multiple objects, one of which may be associated with the shape.

In some implementations, providing an indication of the particular object includes displaying one or more thumbnail images that include a representation of the particular object. For example, with respect to FIG. 1, providing an indication of the first object (e.g., the person 112) can include displaying the thumbnail images 222a-222b that include representations of the person 112 from previous frames of a sample video with respect to the current video frame being analyzed (e.g., the fourth frame 110d).

In some implementations, displaying the one or more thumbnail images includes displaying at least one image captured from one or more areas of at least one video frame other than the video frame. For example, with respect to FIGS. 1-2, the set of thumbnail images 212 for the first object (e.g., the person 112) can include the thumbnail 222a captured from the area of the first frame 110a corresponding to the box 122a. That is, the set of thumbnail images 212 for the first object (e.g., the person 112) can include the thumbnail 222a captured from the area of the first frame 110a where a representation of the person 112 is located. Similarly, the set of thumbnail images 212 for the first object (e.g., the person 112) also includes the thumbnail 222b captured from the area of the second frame 110b corresponding to the box 122b.

In some implementations, the at least one video frame includes one or more video frames that correspond to one or more times that are earlier than a time corresponding to the video frame. For example, with respect to FIGS. 1-2, where the sample video includes the frames 110a-110d, the one or more video frames that correspond to one or more time that are earlier than a time corresponding to the fourth frame 110d currently being analyzed would include the first frame 110a, the second frame 110b, and the third frame 110c. As a result, the set of thumbnails 212 corresponding to the person 112 and the set of thumbnails 214 corresponding to the car 114 could each include thumbnails taken from the first frame 110a, the second frame 110b, or the third frame 110c.

In some implementations, the at least one video frame includes one or more video frames that have been previously analyzed by the user. For example, with respect to FIGS. 1-2, where the sample video includes the frames 110a-110d and one or more subsequent frames such as a fifth frame that follows the fourth frame, the one or more video frames that have been previously analyzed by the user 108 (or by another user) can include any of the frames of the sample video that have already been analyzed. As a result, the set of thumbnails 212 corresponding to the person 112 and the set of thumbnails 214 corresponding to the car 114 could each include thumbnails taken from the first frame 110a, the second frame 110b, the third frame 110c, or the fifth frame if those frames have already been analyzed such that the objects in those frames have previously been identified (e.g., a shape drawn around the objects in the frames and the shapes have been labelled).

In some implementations, displaying the at least one image includes determining a threshold number of thumbnail images to display, identifying one or more video frames other than the video frame that include representations of the particular object, selecting from among the one or more video frames a subset of video frames, and capturing an image that includes a representation of the particular object from each video frame in the subset of video frames to generate the one or more thumbnail images. Here, a number of video frames in the subset of video frames can be the threshold number. For example, with respect to FIGS. 1-2, a threshold number of thumbnail images to be displayed may be set to three. Accordingly, the system 100 may select up to three thumbnail images to display that include representations of the person 112 as part of the set of thumbnails 212 and, similarly, may select up to three thumbnail images to display that include representations of the car 114 as part of the set of thumbnails 214. The system 100 may determine that first frame 110a and the second frame 110b each include a representation of the person 112. Since there are only two unique representations of the person 112 from the frames 110a-110b and the thumbnail threshold is three, the system 100 may determine to display both the thumbnail 222a captured from an area of the first frame 110a defined by the box 122a and the thumbnail 222b captured from an area of the second frame 110b defined by the box 122b without further analysis.

In some cases, where the number of representations of a given object is greater than a threshold number of thumbnail images to display, the system 110 may rank the representations of the given object and select the threshold number of highest ranking representations. That is, for example, where the number of thumbnails that have been generated for a given object (or that could be generated for a given object) is greater than a threshold number of thumbnail images to display, the system 110 may rank the thumbnails of the given object and select the threshold number of highest ranking thumbnails for display in the re-association interface 210.

Ranking the thumbnail images may be based on a number of factors, such as, for example, the size (e.g., pixel size) of the representation/thumbnail of the object, whether the representation/thumbnail of the object contacts an edge of a corresponding frame, whether the representation/thumbnail of the object includes a key feature of the object (e.g., face where the object is a person), whether the representation/thumbnail of the object is partially occluded, the temporal proximity of the frame that the representation/thumbnail of the object is being taken from to the frame currently being analyzed, quality of the frame where the representation/thumbnail of the object is being taken from, etc.

In some implementations, the subset of video frames include those video frames among the one or more video frames that have the closest temporal proximity to the video frame, those video frames among the one or more video frames that include the highest quality representation of the particular object. As an example, with respect to FIGS. 1-2, if the threshold number of thumbnail images is set to one (e.g., by the user 108), the system 100 may determine to display the thumbnail 222b since the second frame 110b from which the thumbnail 222b was generated from has a closer temporal proximity to the fourth frame 110d currently being analyzed than the first frame 110a from which the thumbnail 222a was generated. Alternatively, the system 100 may determine to display the thumbnail 222a since the thumbnail 222a has a slightly larger pixel size than the thumbnail 222b, and because the representation of the person 112 in the thumbnail 222b is partially occluded by trees.

In some implementations, as mentioned above, the quality of the representation of the particular object is determined based on one or more of a size of the representation of the particular object in a video frame, whether the representation of the particular object in a video frame is occluded or partially occluded, or whether the representation of the particular object includes a key feature of the particular object. For example, the system 100 may use an algorithm, such as a static algorithm, or a machine learning model that takes into account one or more quality factors to determine a rank for various thumbnails of a given object. Some of the factors may be weighed by the algorithm or machine learning algorithm differently. For example, a weight of 0.6 may be applied to the size of the thumbnail and a weight of 0.4 may be applied to the determination as to whether a representation in the thumbnail is partially occluded. The weight applied to the factor of whether a representation in a given thumbnail is partially occluded may be based on a determined confidence in occlusion of the subject object (e.g., weight applied decreases with increased confidence that the subject object is partially occluded), and/or on an estimated percentage of occlusion (e.g., weight applied decreases with increased extent of occlusion of the subject object). A threshold number can be applied to this ranking of thumbnails for the system 100 to determine those threshold number of thumbnails that should be displayed in the re-association interface 210.

In some implementations, displaying the one or more thumbnail images includes displaying multiple thumbnail images that correspond to multiple video frames other than the video frame, and arranging the multiple thumbnail images by temporal proximity of their corresponding video frames to the video frame. For example, with respect to FIGS. 1-2, the system 100 can arrange the thumbnails 222a-222b in the set of thumbnails 212 based on the temporal proximity of the corresponding frames 110a and 110b to the fourth frame 110d currently being analyzed. As shown, the system 100 has arranged the thumbnails 222a-222b in the set of thumbnails 212 such that the thumbnails that are generated from frames with the lowest temporal proximity are placed farthest to the left in the set of thumbnails 212 of the re-association interface 210.

In some implementations, displaying multiple thumbnail images that include representations of the particular object from the multiple video frames other than the video frame, and arranging the multiple thumbnail images that include representations of the particular object by temporal proximity of their corresponding video frames to the video frame. For example, with respect to FIGS. 1-2, the system 100 can generate the thumbnail 222a from the area of the first frame 110a defined by the box 122a and can generate the thumbnail 222b from the area of the second frame 110b defined by the box 122b. The system 100 can proceed to display the thumbnails 222a-222b in the re-association interface 210 in an arrangement based on the temporal proximity of their corresponding frames 110a and 110b, respectively, to the fourth frame 110d currently being analyzed. The arrangement of the thumbnails 222a-222b in the re-association interface may alternatively or additionally be based on one or more other factors, such as a quality of the thumbnails (e.g., pixel size, occlusion of subject object, etc.).

The process 400 includes receiving an input to associate the shape with the particular object (410). For example, the client device 106 may receive a selection of the indication of the particular human. This input may be made by a client device user (e.g., the user 108 as shown in FIGS. 1-2). This input may include one or more touch inputs, mouse inputs, stylus inputs, etc. This input may include a selection of an indication of the particular object, such as a selection of a thumbnail or a selection of a label.

The process 400 includes associating the shape with the particular object (412). For example, the client device 106 may store that the shape drawn by a user for Frame 4 shows the same particular human that is shown in Frame 2. Associating the shape with the particular object may be triggered by user (e.g., the user 108 as shown in FIGS. 1-2) input that indicates to associate the shape with the particular object. Associating the shape with the particular object may include relabeling the shape so that it includes the label associated with the particular object (e.g., relabeling the box 128 from "4" to "1" after re-association as shown in FIG. 2).

In some implementations, the process 400 includes assigning a label to the shape in response to receiving an input drawing a shape around an area of the video frame. For example, with respect to FIGS. 1-2, the system 100 can assign a label "4" to the person 118 in response to the user 108 drawing the box 128 bounding the person 118. Associating the shape with the particular object can include determining a second label that corresponds to the particular object, and assigning the second label to the shape in place of the label. For example, with respect to FIGS. 1-2, in response to the user 108 re-associating the box 128 with the person 112, the system 100 can assign a label "1" to the box 128 in place of the label "4" as shown in the updated interface 216.

In some implementations, the process 400 includes identifying one or more objects other than the particular object that were associated with one or more previous shapes in at least one video frame other than the video frame, and providing indication for the one or more objects. For example, with respect to FIGS. 1-2, the system 100 can identify the car 114 in addition to the person 112 as objects that were previously associated with shapes in one or more other frames of the sample video, and can display the set of thumbnails 214 corresponding to the car 114 in addition to the set of thumbnails 212 corresponding to the person 112. The system 100 may determine to display the set of thumbnails 214 corresponding to the car 114 after determining that no shapes in the fourth frame 110*d* currently being analyzed are associated with the car 114 (e.g., no shape in the frame 110*d* has been assigned the label "2" that corresponds to the car 114). As discussed above, the system 100 may determine not to display one or more other identified objects based on the one or more other objects not having a high enough rank to be displayed (e.g., system 100 may not display objects that have a likelihood of being the person 118 that is below a threshold likelihood), and/or based on the one or more other objects having been classified as types of objects that are different from a classification of the person 118 (e.g., the system 100 may not display thumbnails corresponding to the dog 116 due to the dog 116 being classified as an animal and the person 118 being classified as a person).

In some implementations, the process 400 includes determining an order for the particular object and the one or more objects based on at least one of recency of deletion of the particular object and the one or more objects, coordinate proximity of locations of shapes corresponding to the particular object and the one or more objects to a location of the shape, similarity between sizes of shapes corresponding to the particular object and the one or more objects to a size of the shape, and similarity between profiles of shapes corresponding to the particular object and the one or more objects to a profile of the shape. The order can additionally or alternatively be based on classifications of the previously identified objects and of the object being re-associated. As an example, the system 100 may determine an order (e.g., a rank) of the previously identified objects that the person 118 might be. The system 100 may determine that the person 112 has a higher rank than the car 114 based on the location of the box 122*b* corresponding to the person 112 in the second frame 110*b* having a size and shape that is more similar to the size and shape of the box 128 in the frame 110*b* than the box 124*b* corresponding to the car 114 in the frame 110*b*. Providing indications for the one or more objects can include arranging the indications for the particular object and the one or more objects based on the order. For example, the system 100 can place the set of thumbnails 212 corresponding to the person 112 above the set of thumbnails 214 corresponding to the car 114 in the re-association interface 210.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
   displaying a video frame that includes representation of one or more objects;
   receiving an input drawing a shape enclosing an area of the video frame, wherein the area of the video frame is less than a total area of the video frame;
   receiving an input to associate the shape with a previously identified object;
   identifying a particular object that was associated with a previous shape in a previous video frame and is currently not associated with a shape in the video frame;
   based on the particular object, identifying multiple video frames other than the video frame that include representations of the particular object;
   ranking the multiple video frames according to (i) a temporal proximity of each video frame from the multiple video frames to the video frame, (ii) a quality of the representations of the particular object, or (iii) the temporal proximity of each video frame from the multiple video frames to the video frame and the quality of the representations of the particular object;
   selecting a subset of the multiple video frames using their ranking among the multiple video frames;
   obtaining one or more images of the particular object from the subset of the multiple video frames;
   displaying, in a user interface, the one or more images as a set of one or more thumbnail images for the particular object;
   receiving, through the user interface, an input to associate the shape with the particular object; and
   associating the shape with the particular object;
   identifying a second object other than the particular object that was associated with a second shape in a previous video frame and is currently not associated with a shape in the video frame;
   based on the second object identified, identifying a plurality of video frames other than the video frame that include representations of the second object;
   ranking the plurality of video frames according to (i) temporal proximity to the video frame, (ii) quality of the representations of the particular object, or (iii) temporal proximity to the video frame and quality of the representations of the particular object;

selecting a subset of the plurality of video frames using their ranking among the plurality of video frames;

obtaining one or more images of the second object from the subset of the plurality of video frames; and displaying, in the user interface, the one or more images of the second object as a second set of one or more thumbnail images for the second object with the set of one or more thumbnail images for the particular object.

2. The method of claim 1, wherein obtaining the one or more images of the particular object comprises capturing the one or more images of the particular object from areas of the multiple video frames.

3. The method of claim 1, wherein the multiple video frames include one or more video frames that correspond to one or more times that are earlier than a time corresponding to the video frame.

4. The method of claim 3, wherein the one or more video frames were captured at one or more times earlier than a time at which the video frame was captured.

5. The method of claim 1, wherein the multiple video frames include one or more video frames that have been previously analyzed by a user.

6. The method of claim 1, wherein selecting the subset of the multiple video frames comprises:

determining a threshold number of thumbnail images to display; and selecting, from the ranked video frames, the threshold number of highest ranking video frames.

7. The method of claim 1, wherein the quality of a representation of the particular object is determined based on one or more of a size of the representation of the particular object in a video frame.

8. The method of claim 1, wherein displaying the one or more images of the particular object as a set of one or more thumbnail images comprises:

displaying multiple thumbnail images that correspond to a plurality of video frames other than the video frame, wherein the subset of the multiple video frames includes the plurality of video frames; and arranging the multiple thumbnail images by temporal proximity of their corresponding video frames to the video frame.

9. The method of claim 1, comprising assigning a label to the shape in response to receiving the input drawing the shape enclosing the area of the video frame, wherein associating the shape with the particular object comprises:

determining a second label that corresponds to the particular object; and assigning the second label to the shape in place of the label.

10. The method of claim 1, comprising determining an order for the particular object and the second object based on at least one of recency of deletion of the particular object and the second object, coordinate proximity of locations of shapes corresponding to the particular object and the second object to a location of the shape, similarity between sizes of shapes corresponding to the particular object and the second object to a size of the shape, and similarity between profiles of shapes corresponding to the particular object and the second object to a profile of the shape, wherein displaying the second set of one or more thumbnail images for the second object with the set of one or more thumbnail images for the particular object comprises arranging the sets of one or more thumbnail images based on the order.

11. The method of claim 1, wherein identifying the particular object that was associated with the previous shape in the previous video frame and is currently not associated with a shape in the video frame comprises:

identifying as the previous shape a shape that had been drawn in the previous video frame;

identifying the particular object as an object that had been associated with the previous shape; and determining that one or more shapes drawn in the video frame are presently associated with objects other than the particular object.

12. The method of claim 11, wherein:

identifying the particular object as an object that had been associated with the previous shape comprises:

identifying a label attached to the previous shape; and determining that the label is associated with the particular object, and determining that the one or more shapes drawn in the video frame are presently associated with objects other than the particular object comprises determining that labels attached to the one or more shapes drawn in the video frame do not match the label attached to the previous shape.

13. The method of claim 1, wherein the quality of the representation of the particular object is determined based on whether the representation of the particular object in a video frame is occluded or partially occluded.

14. The method of claim 1, wherein the quality of the representation of the particular object is determined based on whether the representation of the particular object includes a key feature of the particular object.

15. The method of claim 14, wherein:

the particular object is a person; and the key feature is a face of the person.

16. A system comprising:

one or more computers; and one or more computer-readable media storing instructions that, when executed, cause the one or more computers to perform operations comprising:

displaying a video frame that includes representation of one or more objects;

receiving an input drawing a shape enclosing an area of the video frame, wherein the area of the video frame is less than a total area of the video frame;

receiving an input to associate the shape with a previously identified object;

identifying a particular object that was associated with a previous shape in a previous video frame and is currently not associated with a shape in the video frame;

based on the particular object, identifying multiple video frames other than the video frame that include representations of the particular object;

ranking the multiple video frames according to (i) a temporal proximity of each video frame from the multiple video frames to the video frame, (ii) a quality of the representations of the particular object, or (iii) the temporal proximity of each video frame from the multiple video frames to the video frame and the quality of the representations of the particular object;

selecting a subset of the multiple video frames using their ranking among the multiple video frames;

obtaining one or more images of the particular object from the subset of the multiple video frames;

displaying, in a user interface, the one or more images of the particular object as a set of one or more thumbnail images for the particular object;

receiving, through the user interface, an input to associate the shape with the particular object; and associating the shape with the particular object.

17. The system of claim 16, wherein obtaining the one or more images of the particular object comprises capturing the one or more images of the particular object from areas of the multiple video frames.

18. The system of claim 16, wherein identifying the particular object that was associated with the previous shape in the previous video frame and is currently not associated with a shape in the video frame comprises:

identifying as the previous shape a shape that had been drawn in the previous video frame;

identifying the particular object as an object that had been associated with the previous shape; and determining that one or more shapes drawn in the video frame are presently associated with objects other than the particular object.

19. One or more non-transitory computer-readable media storing instructions that, when executed by one or more computers, cause the one or more computers to perform operations comprising:

displaying a video frame that includes representation of one or more objects;

receiving an input drawing a shape enclosing an area of the video frame, wherein the area of the video frame is less than a total area of the video frame;

receiving an input to associate the shape with a previously identified object;

identifying a particular object that was associated with a previous shape in a previous video frame and is currently not associated with a shape in the video frame;

based on the particular object, identifying multiple video frames other than the video frame that include representations of the particular object;

ranking the multiple video frames according to (i) a temporal proximity of each video frame from the multiple video frames to the video frame, (ii) a quality of the representations of the particular object, or (iii) the temporal proximity of each video frame from the multiple video frames to the video frame and the quality of the representations of the particular object;

selecting a subset of the multiple video frames using their ranking among the multiple video frames;

obtaining one or more images of the particular object from the subset of the multiple video frames;

displaying, in a user interface, the one or more images of the particular object as a set of one or more thumbnail images for the particular object;

receiving, through the user interface, an input to associate the shape with the particular object; and associating the shape with the particular object.

* * * * *